Jan. 8, 1924. Re. 15,740

R. W. SCOTT

KNITTING MACHINE NEEDLE

Original Filed May 1, 1920 3-Sheets-Sheet 1

Inventor
Robert W. Scott
by
Howson and Howson
his Attorneys

Jan. 8, 1924. Re. 15,740

R. W. SCOTT

KNITTING MACHINE NEEDLE

Original Filed May 1, 1920 3 Sheets-Sheet 2

Inventor
Robert W. Scott
by
Howson and Howson
his Attorneys

Jan. 8, 1924. Re. 15,740

R. W. SCOTT

KNITTING MACHINE NEEDLE

Original Filed May 1, 1920 3 Sheets-Sheet 3

Inventor
Robert W. Scott
by
Howson and Howson
his Attorneys

Reissued Jan. 8, 1924. Re. 15,740

UNITED STATES PATENT OFFICE.

ROBERT W. SCOTT, OF BABYLON, NEW YORK.

KNITTING-MACHINE NEEDLE.

Original No. 1,385,929, dated July 26, 1921, Serial No. 378,233, filed May 1, 1920. Application for reissue filed April 30, 1923. Serial No. 635,715.

DIVISION A.

*To all whom it may concern:*

Be it known that I, ROBERT W. SCOTT, a citizen of the United States of America, residing in Babylon, in the county of Suffolk, in the State of New York, have invented certain new and useful Knitting-Machine Needles, of which the following is a specification.

My invention consists of an improved construction of knitting machine needles and means for operating these needles.

The most common form of knitting machine needle is that whose hooked end is provided with a pivoted latch. This possesses the fault of weakness of the structure at the pivoting point. The finer the gage the more difficult it is to get a sufficiently strong construction at this pivoting point of the latch. Some modern machines are made in such fine gages as to require the use of needles as small as .020 inch in thickness. In such a needle the walls at each side of the slot in which the latch plays are so thin and weakened to so great an extent by the hole for the latch pivot that they will not withstand the strains, especially when in operation at the high speed at which modern knitting machines are run; any pressure applied sidewise to the latch will cause the walls of the needle near the pivoting point to separate, and so cause the latch pivot to become loose and protrude at one side or the other, and interfere with and break the yarn and cause waste and uneven faulty work.

A further objection to the latch needle is that owing to the incline of the latch in its closed position, combined with the width of the latch at its outer end, considerable strain is put upon the old loop in casting off, and this is more especially troublesome in the case of the secondary knitting needles in rib knitting machines.

The employment of the well known spring beard needle has been tried to overcome these difficulties. Being a one-piece construction, the spring beard needle is free from some of the described disadvantages of the common three-piece latch needle, but it has been found that such a spring beard needle, when employed in a circular stocking knitting machine, for example, where each needle is operated independently to draw the stitch, has developed faults as pronounced as those of the common latch needle.

The spring beard needle when used as a secondary needle (for instance in the dial of a rib-knitting machine in which the yarn is first fed to and drawn into loops by the cylinder needle), has the serious fault of not providing sufficient room between the old loops and the incoming thread which is to form the new loop, to permit the pressing of said beard over the new loop and beneath the old loop, and this same difficulty is encountered when the spring beard needle is employed as a primary needle, where it is operated independently to draw the stitch, and it is necessary to provide some means for holding the incoming yarn so as to give a space between the incoming yarn and the old loop, to insure that the beard of the needle may be pressed at the right stage.

To provide a knitting instrument which will be free from the objections to which the latch needle and spring beard needles are subject, especially in fine gage machines, I make use of a composite needle of two elements, one being provided with any suitable drawing hook to take the new loop of yarn, and the other being preferably a slide provided with a hook to take the loop from the drawing hook part of the needle and actively cast it off over the new loop which meantime has been drawn through it. These elements which, for convenience, may be termed the drawing and casting elements, are of the same width, to fit and be guided in the needle grooves of the cylinder or dial and preferably to slide upon each other.

In the accompanying drawings—

Fig. 17 is a view of a modification.

Figure 2:
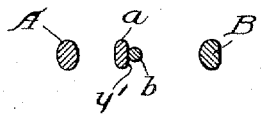
Fig. 2 is a section on the line 2—2, Fig. 1.

The element A, which I have spoken of as the drawing needle, has the main portion of its shank 20 with a butt 21, (Fig. 6), of any usual and convenient construction to be acted on by the needle cams, the shank being guided in a needle groove in the needle cylinder C or dial, as the case may be. At its operative end, this needle has a hook *a* of a shape suitable to take the yarn fed thereto from the yarn guides and draw it into a loop.

With this drawing needle A I combine a loop-carrying and casting needle element B, the shank 23 of which is preferably of the same thickness as the shank of the needle element A and adapted to be guided in the same needle groove. This element B may have any suitable form of butt 24 to be acted on by needle cams in the cylinder or dial, as the case may be. This element B has at its active end a hook *b* with a return bend, the open side of the hook facing toward the hook *a* of the needle element A.

Figure 1:
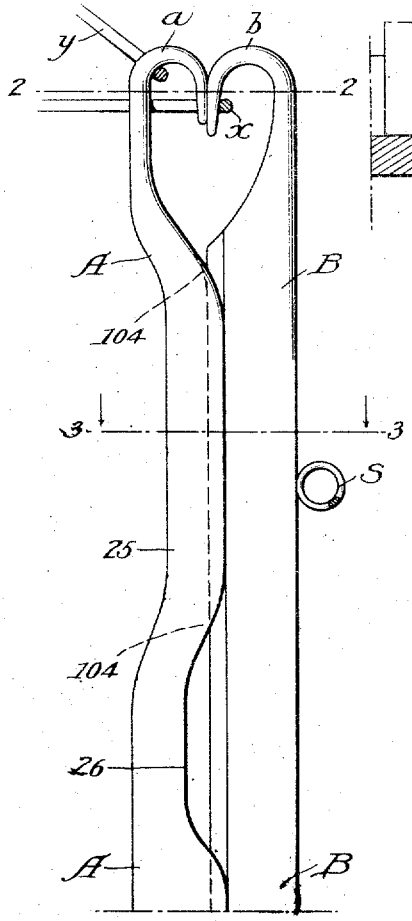
Figure 1 is a skeleton side view drawn to an enlarged scale of the operative ends of the two needle elements.

The shanks of the drawing needle A and the element B slide upon each other, and the usual coiled spring *s*, Fig. 1, bears against the outside of the shank of the element B to maintain the two elements of the needle together and in the needle grooves of the carrier.

Figure 3:
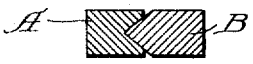
Fig. 3 is a section on the line 3—3, Fig. 1.
Figure 4:
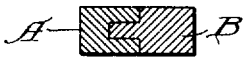
Fig. 4 is a similar section of a modification.

For a portion of the length of the shanks, toward their hooked ends, the two elements may have guiding grooved connection with each other. Preferably the shank of the needle element A has a V-shaped groove as seen at Fig. 3 to receive the adjacent V-shaped edge of the shank of the slide B. Or if preferred, some other form of grooved guiding connection, for instance such as shown in Fig. 4, may be employed.

This grooved guiding connection of the two parts is such that it is maintained in all working positions of the parts, and missing of stitches is thereby prevented.

The grooved portion of the shank of the needle element A may be formed by offsetting the shank as seen at 25 in Fig. 1. Toward their butt ends the adjacent faces of the two needle elements may have flat bearing faces, but just back of the offset 25 I prefer to form the shank of the needle A with an offset 26 in the direction the opposite of the offset 25, for a purpose which I will hereinafter explain.

Figure 5:
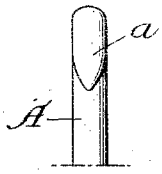
Fig. 5 is a face view of the hook of the drawing needle element.

The open sides of the hooked ends of the needle elements A and B face toward each other without overlapping in the direction of the plane in which the hooks lie, as shown in the drawings, and I prefer to form the hook *a* of the part A of a flattened cross-section, such as indicated in Fig. 2, while the hook *b* of the element B may have its neck of a triangular cross-section and its outer end pointed, as also shown in the same Fig. 2. The flattened outer end of the hook *a* may be brought to a point as seen in Fig. 5.

Figure 10:
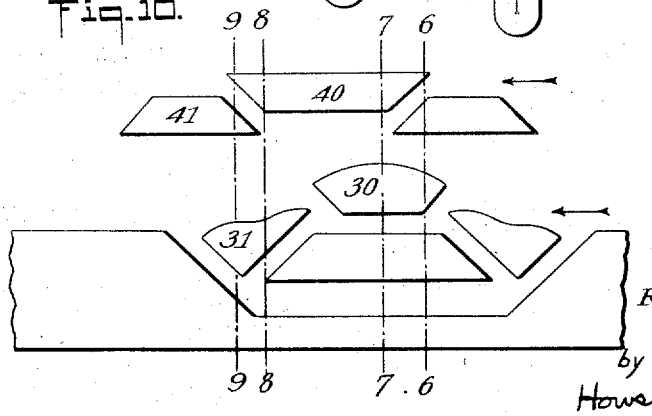
Fig. 10 is a diagram of needle cams which may be employed to actuate these needle elements.

In Fig. 6 to 9, I have shown successive positions taken by the drawing element A and the element B under the action of the needle cams shown in Fig. 10. In this Fig. 10, I have drawn dotted lines at 6, 7, 8 and 9, corresponding to the positions reached by the needles as shown in Figs. 6, 7, 8 and 9, respectively, it being assumed that the circle of needles is traveling relatively to the cams in the direction of the arrows, Fig. 10. In the several Figs. 6 to 9, the level of the bottom of the throats of web holders is indicated by the dotted line *z—z*.

Figures 6, 7, 8, 9, 11:
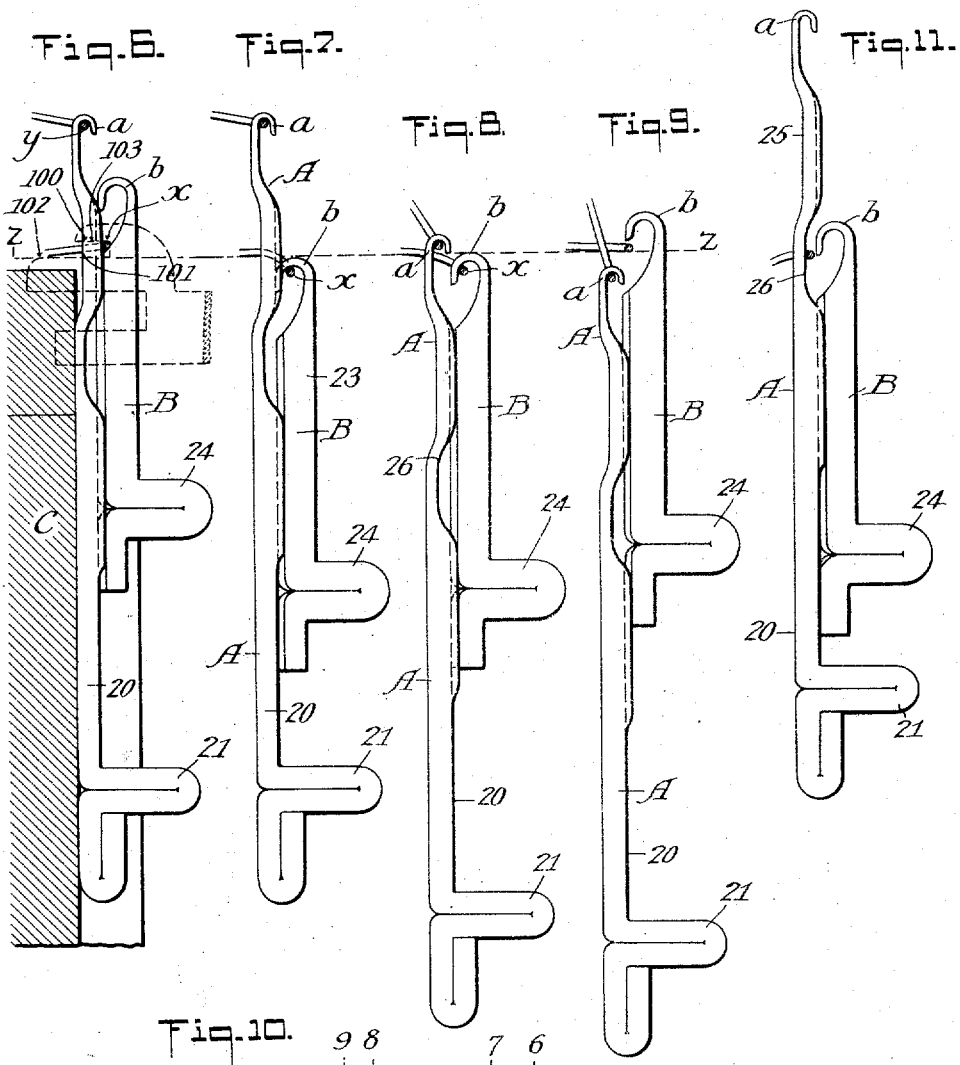
Figs. 6, 7, 8 and 9 are views showing different positions successively taken by the two needle elements in knitting.
Fig. 11 is a view showing the positions assumed by the needle elements when elevated to the non-knitting position as in reciprocating work when knitting heels or toes of stockings.

In Fig. 6, the drawing element A has begun to retract under the action of the center cam 30 after taking the new yarn *y* fed to the yarn guides and the hook *b* of the element B is ready to take the old loop *x*, which is on the shank of the element A. At 7, Fig. 10, this part B has been retracted by the upper center cam 40, so that the hook *b* of this element B has drawn back the old loop *x*, Fig. 7. At 8, the part A has been retracted by the cam 31, while the part B is about to be projected under the action of the cam 41, so that as the hook *a* is about to draw the new loop *y* through the old loop *x*, Fig. 8, the hook *b* has begun to move the old loop in the opposite direction, to carry the old loop *x* over the hook *a* of the element A without frictional contact with the part A. At 9, the element A has been fully retracted by the cam 31 and has pulled the new loop *y* through the old loop *x* without contact of the new loop with the part B, while the part B continuing to be projected under the action of the cam 41, has carried the loop *x* clear of the needle element A and to the verge of the cylinder (or dial) and by the time the needle element B has reached its highest or outermost position, the hook *b* has dropped the loop *x* on the legs of the loop *y*, leaving the loop *x* and the fabric free to be fed away from the knitting point by the action of the web holders or the tension of a web take-up. The parts B with their hooks *b*, moreover, in respect to stresses on the old yarn loop in the direction of the needle hook *a* virtually constitute a web-holder.

This construction and this mode of operation of the needle elements relieve the yarn of considerable strain at the knocking over point. This is an especially valuable feature in connection with the secondary knitting needles which in rib knitting machines take their loops from the primary needles. The disadvantage of the latch needle construction in this respect is that it necessitates the draft of the needle much farther within the verge of the dial than is actually necessary to draw off enough yarn for the new loop, in order to take it through the displaced old loop, and requires the use of an extraordinary amount of weight upon the fabric to assist in the knocking over of the old loop. This has always been a difficulty in operating rib knitting machines employing latch needles, because it causes an undue strain upon the incoming yarn, and frequent faults in the fabric result therefrom.

Figure 12:
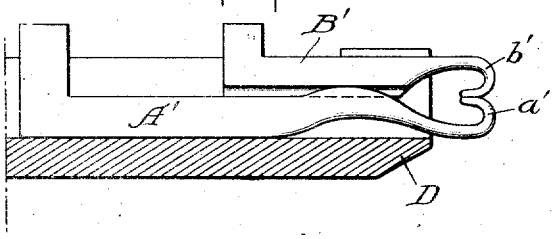
Fig. 12 is a view illustrating my improved needle as used in the dial of a knitting machine.
Figure 14:
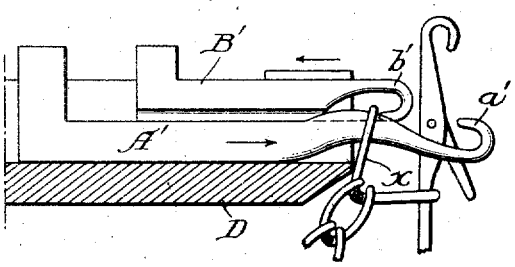
Fig. 14 is a view showing these parts in still other positions.
Figure 13:
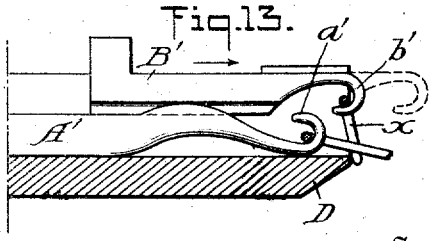
Fig. 13 is a similar view, showing the two needle elements in another position.

These difficulties are entirely overcome by the employment of the two-part needles and their mode of operation hereinbefore described. In Figs. 12 and 13 and 14, I have illustrated such a needle in a dial, with the two parts of the needle in different positions, and in Figs. 15 and 16 I have shown sufficient of the dial and cylinder cams to illustrate the operations of these two-part needles. The cam groove F of the dial cap Fig. 15, engages the butts of the needle element $A^1$ of Figs. 12 and 13, while the groove G engages the butts of the hooked elements $B^1$. The direction of movement of the needles in relation to the cams is indicated by the arrows in Fig. 15. In Fig. 16, I have illustrated corresponding cams to act upon the corresponding needles in the cylinder.

The lines K, K of the respective figures are in the same radial plane, and the cylinder stitch cam 45 operates while the dial needles $A^1$ are in the part 28 of their cam groove, and prior to their retraction by cam 29. The dial needles are thus the secondary needles.

Figure 15:
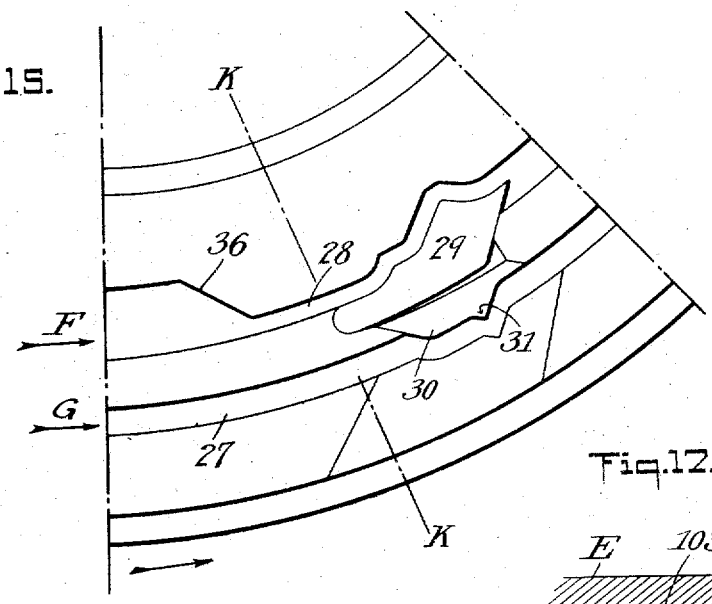
Figs. 15 and 16 are diagrams of dial cams and corresponding cylinder cams which may be employed for the operation of my needles in a rib-knitting machine.
Figure 12:
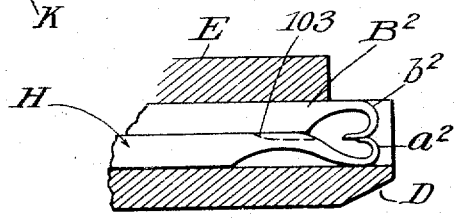
Figure 16:
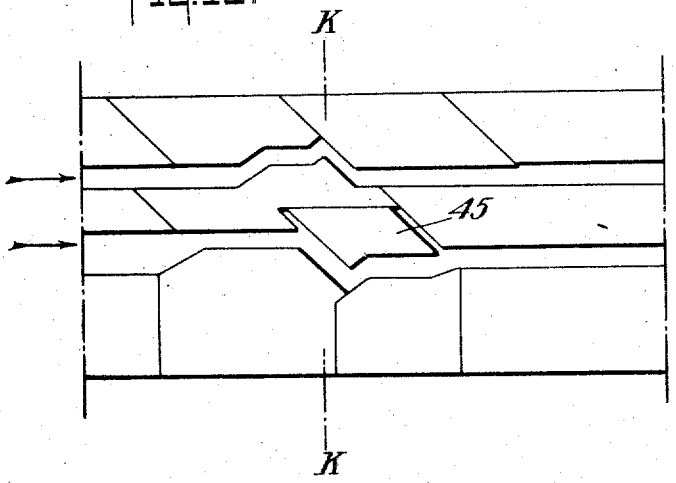

Referring to Fig. 15, it will be seen that while the needle elements $B^1$ are at rest in their neutral or innermost position with their butts in the section 27 of the groove G, the needle elements $A^1$ are being projected by the cam 36 to their outermost position in the groove 28. As the needle element $A^1$, after taking the stitch is retracted by the cam 29, the part $B^1$ is partially projected by the cam 30 into a position substantially like that shown by full lines in Fig. 13. As the inward movement of the needle element $A^1$, with the new loop continues the slide $B^1$ is projected farther outwardly by the peak 31 of the cam, (Fig. 15), or substantially to the position shown by dotted lines in Fig. 13. In other words, as the needle $A^1$ is being retracted to draw the new loop, the old loop is being actively carried in the opposite direction by the needle element $B^1$ without harmful frictionaly contact of the loop with the needle $A^1$. By the time the part $B^1$ has reached its outermost position, the old loop is free to drop off the hooked end of the needle element $B^1$.

This coaction of the parts of the needle enables the needle to be fed as a secondary, to draw the new-course secondary loops from the runs between the cylinder needles, and to knock over the last course of secondary loops on the new loops, without drawing said previous secondary loops within the verge of the dial.

In the case of the dial needles, the yarns are handled by the needle elements in a similar way to that described with reference to the cylinder needles. Thus, as seen in Fig. 14, the loop *x* rises on the shank of the drawing implement, A′, as the latter is projected, and the casting implement B′ on being retracted will cause its hook *b′* to enter and engage the old loop *x* on the shank of the drawing implement A′ by entering that loop on the outer side, that is, outer side with relation to the outer and operating ends of the needles. Meantime the drawing implement A′ will draw the yarn, which it has taken, into a new loop through the old loop, while the latter is being carried outwardly over the new loop by the hook *b′* of the projected implement B′, and the loop will be cast off by the time said casting implement has reached the position shown by dotted lines in Fig. 13.

The instrument B (or B′) might be considered as in the nature of a sliding latch, while the instrument A (or A′) might be considered the needle.

The relation of the hooked ends of the instruments A (A′) and B (B′) to each other is such that as the instrument A (A′) is retracted, it draws the new loop through the old loop without contact of the new loop with the instrument B (B′).

The two needle elements $A^1$ and $B^1$ may be held in the grooves in the dial in which they are slidably mounted by suitable retaining means such for example as those indicated in the Swinglehurst Patent 1,314,377, dated August 26, 1919.

Referring again to Figs. 1 to 5, I prefer to make the end of the hook *a* of the needle element A with a comparatively broad face *y′* (Fig. 2) toward the hook *b* of the part B in order that the point of that hook *b* may have a wide bearing and so avoid danger of the two points slipping by each other under pressure of the old loop *x*, Fig. 1. The broadening of the hook of the needle element may be made by bringing the metal to a cross section of a flattened oval, Fig. 2, or by flattening the face of hook *a*, and this may be done before the hook is formed on the needle. As shown in Fig. 5, the extreme end of the hook of the needle element A may be brought to a point, and this is a convenient incident of the flattening process.

When the described construction is to be used on stocking knitting machines, for example, and consequently about one half of the needles have to be projected out of action by a suitable switch cam and picking devices, when knitting the heels and toes, some of the needle elements A will be raised to the positions shown in Fig. 11, bringing the offset 26 in shanks of the needles to a point to permit constant reciprocation of the hook of the member B past said offset 26 without interference with the thread wrapped about the shanks of the elevated and inactive needles.

A switch cam and picking devices suitable for this purpose are such as are commonly used on circular hosiery knitting machines, as illustrated for example in my patent 1,152,850.

Referring to Fig. 1, it will be noticed that the bottom of the V-groove in the shank of the needle element A, while parallel with the tongue of the part B for the major portion of the length of said groove, is curved or beveled inwardly at each end, as shown by the dotted line as at 104, Fig. 1. The purpose of this is to insure the entrance of the point of the hook of the part B into the groove in the needle member A, even though the stitch strain draws or springs the members toward each other after the faces of the hooks are out of contact with each other.

In some cases it is neither necessary nor desirable to have the coacting faces of the needle elements tongued and grooved. In that case, the coacting faces are straight without offset of either as illustrated in the modification, Fig. 17, and the point of the hook $b^2$ of the casting element $B^2$ extends slightly below the plane of the upper surface of the shank of the needle element $A^2$ and takes into a groove 103 to engage the old loop. The cam cap E of the dial affords a perfect bearing against upward thrust.

I do not herein claim a two-part knitting needle with an offset, such as 26, for accommodating the old loop when said needle part is projected out of knitting position, nor do I claim a knitting machine provided with needles each in two relatively movable parts, one of said parts being to draw a loop and the other for casting, in combination with separate means to reciprocate the two parts independently of each other, the loop-drawing part being adapted to be moved to inactive position to hold a loop, while the casting part remains in reciprocation as these features form the subject of my divisional reissue application Serial No. 635,716 of even date herewith.

I claim as my invention:

1. A knitting machine needle in two parts, one a loop-drawing implement and the other a hooked casting implement in combination with means whereby the last named implement is caused on its retraction to enter and engage a previous loop on said loop drawing implement, and the latter is caused to draw yarn for a new loop through said previous loop without contact of the new loop with the casting implement.

2. A knitting machine needle in two parts, one a loop-drawing implement and the other a hooked casting implement in combination with means whereby the last named implement is caused to enter and engage a previous loop on said loop-drawing implement and the latter is caused to draw yarn for a new loop through said previous loop without contact of the new loop with the casting implement, which is operated to then cast off the old loop during movement of the two implements in opposite directions.

3. A knitting machine needle in two parts, one a hooked loop-drawing implement and the other a hooked casting implement in combination with means whereby the last named implement is retracted to thereby enter and engage a previous loop on said loop-drawing implement, and the latter is retracted to draw a new loop without contact of the latter with the casting implement, during motion of the casting implement in the opposite direction to cast off the previous loop.

4. Secondary knitting machine needles each in two parts, one a hooked loop-drawing implement and the other a hooked casting implement in combination with primary knitting needles and means to operate both sets of needles in relation to each other for rib knitting, said means including means whereby the casting implements of the secondary needles are caused on their retraction to enter and engage previous loops on said loop-drawing implements and the latter are caused to draw yarn for new loops through said previous loops without contact of the new loops with the casting implements.

5. A knitting machine needle in two parts of the same maximum width, one part with a drawing hook to draw a new loop and the other having a hook adapted on the retraction of said other part to enter and engage a previous loop on said drawing part and thereafter cast off said old loop.

6. A knitting machine needle in two parts, one having a hook to draw a new loop, while the other has a hook with a return bend to engage and take a previous loop from the first mentioned part, the hooks of the two parts being of the same maximum width.

7. A knitting machine needle in two parts having their shanks in guiding grooved connection with each other and one part having a hook to draw the new loop, while the other has a hook with return bend to enter and to take the old loop from the first mentioned part.

8. A knitting machine needle in two parts having their shanks with adjacent edges in guiding grooved connection with each other in all operative positions, one part being a needle element hooked to draw the yarn into a new loop, and the other part having a hook with a return bend to take the old loop from said needle and thereafter cast it off.

9. A knitting machine provided with two-part needles, one part being hooked to draw the yarn into a new loop, the other part being adapted to take the old loop from said needle part and thereafter cast it off, in combination with means for projecting the loop casting part at the same time that said first part is retracting the new loop without contact of the latter with the casting implement.

10. A knitting machine having a plurality of series of needles and means for operating them in primary and secondary relation to the same yarn, the secondary needles being two part needles, one part being hooked to draw the new loop without contact of the new loop with the other part, and this other part being also hooked to take the loop from said first part in combination with means for simultaneously moving the two parts in opposite directions.

11. A knitting machine having cylinder and dial needles, the latter needles being each in two parts, one having a hook to draw a new loop from the cylinder needle yarn without contact of the new loop with the other part of the needle while said other part has a hook with a return bend to take the previous loop from the drawing part of the needle in combination with means to positively actuate said two parts in different directions.

12. A knitting machine provided with two-part needles, the two parts having hooked operating ends of the same maximum width and with the open sides facing each other and one adapted to take a loop from the other in combination with cam means to project one part while the other is retracted.

13. A knitting machine provided with two-part needles, the two-parts having hooked operating ends with the open sides of the hooks facing each other in combination with cam means to positively actuate the two parts, one part in one direction to draw the new loop without contact with the other part, and said other part to take the old loop from the first mentioned part and to move said second part in the opposite direction to carry and discharge the old loop clear of said new-loop hook.

14. A knitting machine provided with two-part needles, the two parts having hooked operating ends with the open sides of the hooks facing each other without overlapping in combination with cam means to positively actuate the two parts, one part in one direction to draw the new loop and the other part to take the old loop from the first mentioned part and to move said second part in the opposite direction to carry and discharge the old loop clear of said new-loop hook.

15. A knitting machine needle in two parts, in sliding relation to each other, with hooked operating ends, the open sides of the hooks facing each other, the end of one hook having a supporting face for the end of the other hook.

16. A knitting machine needle in two parts, one a loop-drawing implement with a shank having a grooved inner face and the other a casting implement with a return bend hook adapted when retracted to enter said groove to engage the previous loop on the shank of the drawing implement, said groove being beveled at the end for the purpose set forth.

17. A knitting machine needle in two parts in sliding relation to each other and having return bend hooked operating ends with the open sides of the hooks facing each other without overlapping in the direction of the plane in which the hooks lie, and one hook adapted to enter a loop held by the other part, and take said loop from the latter.

In testimony whereof I have signed my name to this specification.

ROBERT W. SCOTT.